March 29, 1938. H. H. WORSSAM 2,112,800
CRAB GRASS ELIMINATOR
Filed Sept. 11, 1936
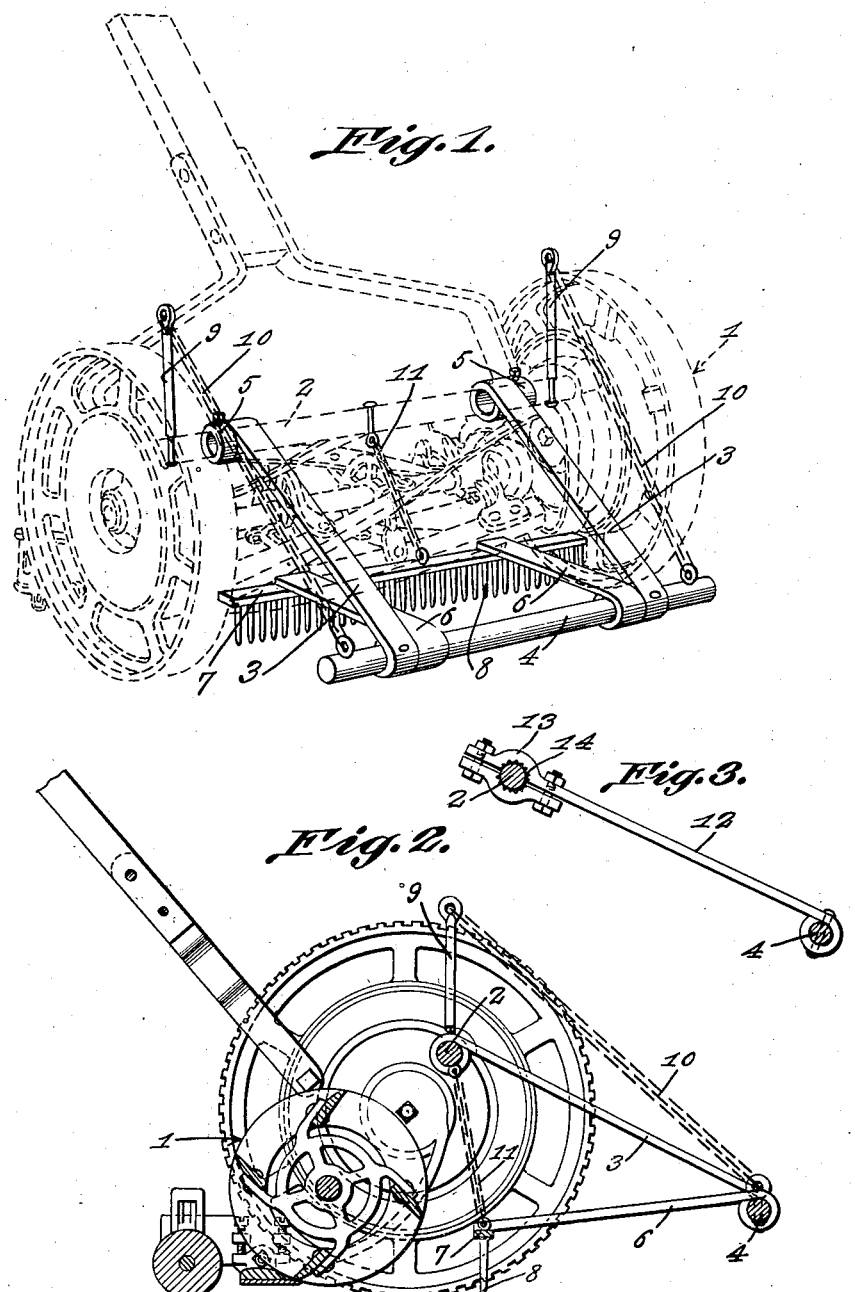
Horace H. Worssam, INVENTOR
BY Victor J. Evans & Co.
ATTORNEYS Patented Mar. 29, 1938

2,112,800

UNITED STATES PATENT OFFICE 2,112,800

CRAB GRASS ELIMINATOR

Horace Herbert Worssam, Babylon, N. Y.

Application September 11, 1936, Serial No. 100,351

1 Claim. (Cl. 56—294)

This invention relates to attachments for lawn mowers and similar devices, and has for the primary object the provision of a simple and inexpensive device which may be readily adapted to a lawn mower and provides therefor a rake traveling in advance of the cutting mechanism so as to disturb or raise up undesirable growth which spreads and lies close to the ground, whereby such growth will be severed by such cutting mechanism so that after several cuttings the undesirable growth will be eliminated.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a perspective view illustrating a lawn mower equipped with an attachment constructed in accordance with my invention.

Figure 2 is a transverse sectional view illustrating the same.

Figure 3 is a side elevation, partly in section, showing a modified form of supporting arm.

Referring in detail to the drawing, the numeral 1 indicates a conventional type of lawn mower wherein a tie bar 2 thereof has mounted thereon an attachment forming the subject matter of the present invention.

The attachment consists of a pair of arms 3 hinged to the tie bar 2 and extending forwardly and downwardly with respect to the lawn mower and have their forward ends connected by a bar 4. Collars 5 are adjustably mounted on the tie bar 2 and act to prevent the arms 3 from shifting longitudinally of the tie bar. Arms 6 are journaled to the bar 4 and extend rearwardly in the direction of the lawn mower and have secured thereto a rake head 7 provided with a plurality of spaced teeth 8, the latter adapted to contact the ground and the growth in advance of the cutting mechanism of the lawn mower.

Vertically arranged rods 9 are secured to the tie bar 2 and connecting said rods to the bar 4 are flexible elements 10 which act to support the bar 4 a desired distance above the ground. A flexible element 11 is secured to the tie bar 2 and to the rake head 7 for governing the action of the rake on the growth, that is, the flexible element 11 may be shortened or lengthened and in that way regulate or adjust the teeth towards and from the ground. The flexible elements 10 may be made of varying lengths to permit the adjustment of the bar 4 with respect to the ground. The flexible elements 10 and 11 each may be in the form of a chain or some other suitable construction to provide the necessary flexibility thereto.

In operation, during the forward movement of the lawn mower the rake disturbs growth which lies close to the surface of the ground, raising such growth so that the cutting mechanism will sever the growth. When not desiring to use the attachment or when passing over sidewalks, the attachment may be swung upwardly and rearwardly with respect to the lawn mower to position the rake in an elevated position and away from the ground.

In use, the rake is free to swing upwardly and downwardly so as to readily pass over unevenness of the ground or obstructions on the ground.

Referring to the modified form of arms which may be substituted for the arms 3 each include an arm portion 12 secured at one end to the bar 4 and the opposite end being constructed to form a detachable clamp 13 having serrated faces 14. The detachable clamp 13 may be readily adapted to the tie bar 2 of the lawn mower. The clamps 13 of the arms 12 permit said arms to be adjusted on the tie bar for the purpose of varying the bar 4 with respect to the ground. When the arms 12 are employed the flexible elements 10 and rods 9 may be eliminated.

While I have described the attachment secured to a lawn mower of the character shown in Figure 1, it is to be understood that this attachment may be readily adapted to power driven lawn mowers or cutting devices.

Having described the invention, I claim:

A lawn mower attachment comprising a bar, arms pivoted on a mower for supporting said bar in advance of the mower free to swing upwardly and downwardly with respect to the ground, arms journaled on the bar and extending towards the mower, a rake secured on the second mentioned arms for engaging growth in advance of the mower, flexible elements connected to the bar, fixed vertically arranged members adapted for support by the mower and having the flexible elements secured to the upper ends thereof and above said bar for supporting the latter at a desired distance above the ground, and means connected to said rake and to the mower for limiting the movement of the rake towards the ground.

HORACE HERBERT WORSSAM.